United States Patent
Jin (10) Patent No.: US 7,265,969 B2
(45) Date of Patent: Sep. 4, 2007

(54) PORTABLE COMPUTER

(75) Inventor: Hyuk-soo Jin, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/893,897

(22) Filed: Jul. 20, 2004

(65) Prior Publication Data

US 2005/0018391 A1  Jan. 27, 2005

(30) Foreign Application Priority Data

Jul. 25, 2003  (KR) ..................... 10-2003-0051627

(51) Int. Cl.
*G06F 1/16* (2006.01)
(52) U.S. Cl. ..................... 361/680; 361/683
(58) Field of Classification Search ............. 361/680, 361/686, 683
See application file for complete search history.

(56) References Cited

U.S. PATENT DOCUMENTS

| | | | | |
|---|---|---|---|---|
| 4,788,658 | A * | 11/1988 | Hanebuth ................... | 361/680 |
| 4,796,007 | A | 1/1989 | Heys, Jr. | |
| 5,510,953 | A * | 4/1996 | Merkel ....................... | 361/680 |
| 5,966,284 | A * | 10/1999 | Youn et al. ................. | 361/680 |
| 6,262,883 | B1 | 7/2001 | Kim | |
| 6,407,914 | B1 * | 6/2002 | Helot ......................... | 361/686 |
| 6,587,094 | B2 * | 7/2003 | Anderson ................... | 345/168 |
| 6,654,234 | B2 * | 11/2003 | Landry et al. .............. | 361/681 |
| 6,672,796 | B2 * | 1/2004 | Chiang et al. .............. | 403/327 |
| 6,805,505 | B2 * | 10/2004 | Horiuchi et al. ............ | 400/472 |
| 2002/0042853 | A1 * | 4/2002 | Santoh et al. .................... | 710/8 |
| 2002/0047832 | A1 * | 4/2002 | Horiuchi et al. ............ | 345/168 |
| 2002/0048155 | A1 * | 4/2002 | Chiang et al. .............. | 361/747 |
| 2002/0085337 | A1 * | 7/2002 | Rubenson et al. .......... | 361/680 |
| 2002/0085338 | A1 * | 7/2002 | Lin ............................. | 361/680 |
| 2003/0021082 | A1 * | 1/2003 | Lu et al. ..................... | 361/683 |
| 2004/0000048 | A1 * | 1/2004 | Wu ............................. | 29/622 |
| 2004/0027795 | A1 * | 2/2004 | Lee et al. ................... | 361/683 |

(Continued)

FOREIGN PATENT DOCUMENTS

CN  2174732 Y  8/1994

(Continued)

OTHER PUBLICATIONS

Korean Office Action for corresponding Korean Application No. 2003-0051627 issued Jan. 20, 2005.

(Continued)

*Primary Examiner*—Lisa Lea-Edmonds
(74) *Attorney, Agent, or Firm*—Staas & Halsey LLP (57) ABSTRACT

A portable computer comprises a main body including a main board, a keyboard assembly to be slidingly inserted into the main body from one side of the main body along a surface of the main body, with a keyboard connector outwardly protruding along a surface of the keyboard assembly, and a main body connector to be connected with the keyboard connector when the keyboard assembly is slidingly inserted into the main body, and transmitting a key signal from the keyboard assembly to the main board. The present invention provides a portable computer in which a structure of a main body and a keyboard assembly enhances an assembly process, reduces production costs, and prevents the insertion of a foreign substance into the main body.

18 Claims, 9 Drawing Sheets

U.S. PATENT DOCUMENTS

2005/0035950 A1* 2/2005 Daniels .................. 345/169

FOREIGN PATENT DOCUMENTS

| | | |
|---|---|---|
| JP | 7-121279 | 5/1995 |
| JP | 7-295705 | 11/1995 |
| JP | 10-161785 | 6/1998 |
| JP | 2001-356863 | 12/2001 |
| KR | 0157275 | 9/1999 |
| KR | 20-201949 | 8/2000 |
| KR | 2000-15493 | 8/2000 |
| KR | 10-343521 | 6/2002 |

OTHER PUBLICATIONS

Chinese Office Action for corresponding Chinese Application No. 200410069996.8 dated Oct. 28, 2005.

* cited by examiner

PORTABLE COMPUTER

CROSS-REFERENCE TO RELATED APPLICATIONS

This application claims the benefit of Korean Patent Application No. 2003-51627, filed on Jul. 25, 2003, in the Korean Intellectual Property Office, the disclosure of which is incorporated herein by reference.

BACKGROUND OF THE INVENTION

1. Field of the Invention

The present invention relates to a portable computer, and more particularly, to a portable computer in which a structure of a main body and a keyboard assembly enhances an assembling process and reduces production costs.

2. Description of the Related Art

Figure 1:
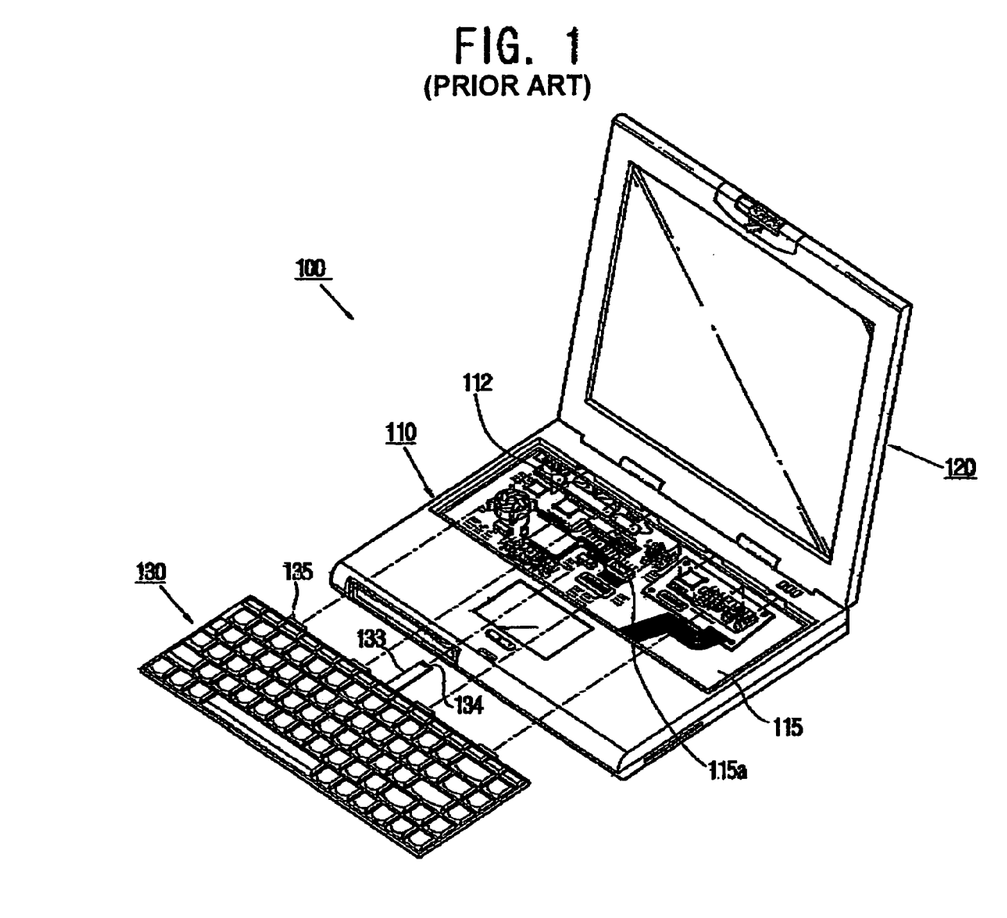
FIG. 1 is an exploded perspective view of a conventional portable computer.

In FIG. 1, a portable computer 100 generally comprises a main body 110, a display 120 such as an LCD (liquid crystal display) to display a picture, and a keyboard assembly 130 provided on an upper surface of the main body 110.

The main body 110 comprises a main board 115 mounted with a CPU (central processing unit: not shown), and a RAM (random access memory: not shown), etc., therein.

The display 120 receives a video signal from the main body 110 and displays a picture. The display 120 and the main body 110 are electrically connected by a cable (not shown). Further, the display 120 is rotatably combined to the main body 110 by a hinge, so that the portable computer 100 can be folded while not in use.

The keyboard assembly 130 is an input unit, and transmits key signals to the main board 115. The keyboard assembly 130 comprises a keyboard circuit board (not shown) which generates the key signal in response to a user's operation.

The keyboard circuit board of the keyboard assembly 130 is connected to the main board 115 through an FPC (flexible printed circuit) 133. The FPC 133 has a first end connected to the keyboard circuit board of the keyboard assembly 130, and a second end provided with a male connector 134. Therefore, the male connector 134 provided in the second end of the FPC 133 is connected to a female connector 115a provided in the main board 115, so that the key signal is transmitted from the keyboard assembly 130 to the main board 115.

In the conventional portable computer 100, an assembly process of the main body 110 and the keyboard assembly 130 is as follows.

First, the male connector 134 provided in the second end of the FPC 133 of the keyboard assembly 130 is connected to the female connector 115a provided in the main board 115. Then, a projection 135 protruding from an edge of the keyboard assembly 130 is inserted into a projection holder 112 formed in a keyboard accommodating part of the main body 110, so that the keyboard assembly 130 is combined to the main body 110.

However, in the conventional portable computer 100, the assembly process of the main body 110 and the keyboard assembly 130 is divided into two operations: electrical connection in which the main body 110 and the keyboard assembly 130 are electrically connected through the FPC 133; and mechanical combination therebetween, so that the assembly process is relatively complicated, thereby increasing total time required to assemble the portable computer.

Since, the FPC 133 is used to electrically connect the main body 110 with the keyboard assembly 130, the production cost increases.

Further, a foreign substance may be inserted into the main body 110 through a gap between the main body 110 and the keyboard assembly 130, and the foreign substance may cause damage to components such as the main board 115.

SUMMARY OF THE INVENTION

Accordingly, it is an aspect of the present invention to provide a portable computer in which a structure of a main body and a keyboard assembly enhances an assembly process, reduces production costs, and prevents insertion of a foreign substance into the main body.

Additional aspects and advantages of the invention will be set forth in part in the description which follows and, in part, will be obvious from the description, or may be learned by practice of the invention.

The foregoing and/or other aspects of the present invention are achieved by providing a portable computer comprising a main body having a main board, a keyboard assembly to be slidingly inserted into the main body from a side of the main body along a surface of the main body and comprising a keyboard connector outwardly protruding in a direction parallel to a surface of the keyboard assembly, and a main body connector to be connected with the keyboard connector when the keyboard assembly is slidingly inserted into the main body, and transmitting a key signal from the keyboard assembly to the main board.

According to an aspect of the invention, the main body connector comprises a board-to-board connector protruding upwardly from the main board.

According to an aspect of the invention, the main body connector is positioned in an edge of the main body in relation to a sliding insertion.

According to an aspect of the invention, the main body comprises at least one connecting port electrically connected to the main board and to which an external device is connected, and the main body connector is incorporated with one of the connecting ports, being laid on the connecting port.

According to an aspect of the invention, the main body comprises an upper casing comprising a keyboard accommodating part having an open side through which the keyboard assembly is slidingly inserted, and a lower casing combined with the upper casing.

According to an aspect of the invention, one of the upper casing and the keyboard assembly is formed with guiding grooves along a sliding direction, and the other is formed with guiding projections inserted in the guide grooves and guiding the keyboard assembly to be slidingly inserted.

According to an aspect of the invention, the main body comprises a covering bracket to cover the open side of the keyboard accommodating part.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below in order to explain the present invention by referring to the figures.

In FIGS. 2-6, a portable computer 1 according to the present invention comprises a main body 10, a display 20 to display a picture, and a keyboard assembly 30 slidingly inserted into the main body 10 from a side of the main body 10 along a surface thereof.

The main body 10 comprises an upper casing 12 comprising a keyboard accommodating part 13 having an open side through which the keyboard assembly 30 is slidingly inserted, and a lower casing 14 combined with the upper casing 12 to form an accommodating space therebetween. The main body 10 further comprises system components such as a main board 15, a CPU and a RAM, and the system components are positioned in the accommodating space formed between the upper casing 12 and the lower casing 14.

The keyboard accommodating part 13 is formed by cutting away a surface of the upper casing 12 to accommodate the keyboard assembly 30. In the present embodiment, the keyboard accommodating part 13 has a rectangular shape, so that the keyboard assembly 30 can be slidingly inserted in the keyboard accommodating part 13.

The keyboard assembly 30 comprises a keyboard circuit board (not shown) to generate a key signal according to a user's operation, a keyboard casing 31 to accommodate the keyboard circuit board, and a keyboard 32 provided on an upper surface of the keyboard casing 31. The keyboard assembly 30 further comprises a keyboard connector 33 outwardly protruding in a direction parallel to a surface thereof, wherein the keyboard connector 33 electrically connects the keyboard circuit board with a main body connector 40 (to be described later), so that the key signal is transmitted from the keyboard circuit board to the main board 15 through the main body connector 40.

The portable computer 1 comprises the main body connector 40 to which the keyboard connector 33 is connected when the keyboard assembly 30 is slidingly inserted in the keyboard accommodating part 13. The main body connector 40 is positioned in an edge of the keyboard accommodating part 13 being opposite to the open side, wherein the main body connector 40 is electrically connected to the keyboard connector 33 when the keyboard assembly is completely accommodated in the keyboard accommodating part 13.

The main body connector 40 has a lower part being directly mounted on the main board 15, and is a board-to-board connector protruding upwardly from the main board 15. The main body connector 40 does not protrude toward the keyboard assembly 30 beyond the upper casing 12 to achieve airtight contact between the upper casing 12 of the main body 10 and the keyboard assembly 30 at an area around the main body connector 40 when the main body 10 and the keyboard assembly 30 are combined.

In the portable computer 1, opposite edges of the keyboard accommodating part 13 provided in the upper casing 12 are formed with guiding grooves 16, 16a along a sliding direction of the keyboard assembly 30, respectively. Guiding projections 36, 36a corresponding to the guiding grooves 16, 16a are formed on opposite edges of the keyboard assembly 30, wherein the guiding projections 36, 36a are inserted in the guiding grooves 16, 16a and guide the keyboard assembly 30 to be slidingly inserted in the keyboard accommodating part 13.

Figure 4:
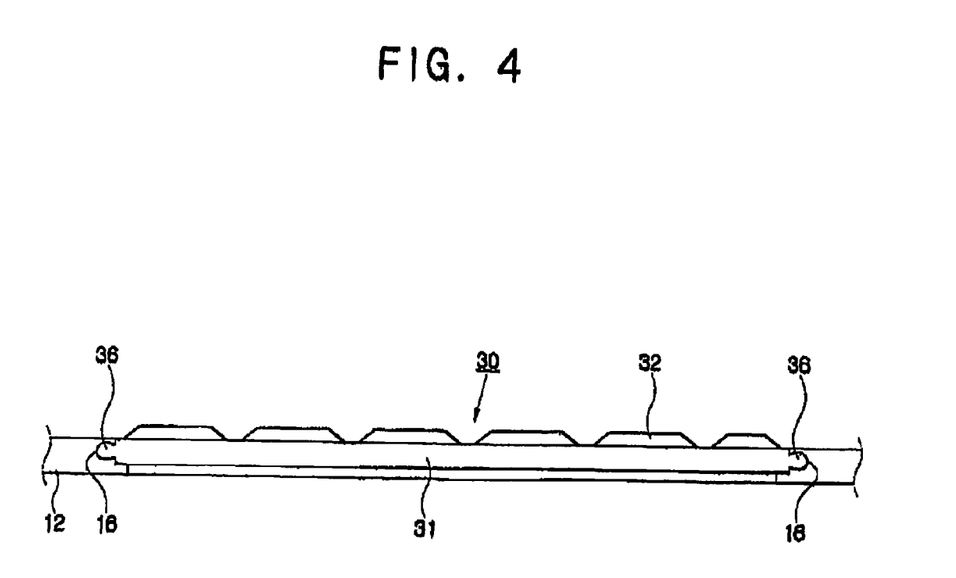
FIGS. 4 and 5 are sectional views illustrating different embodiments of a combination between the keyboard assembly and the main body.
Figure 5:
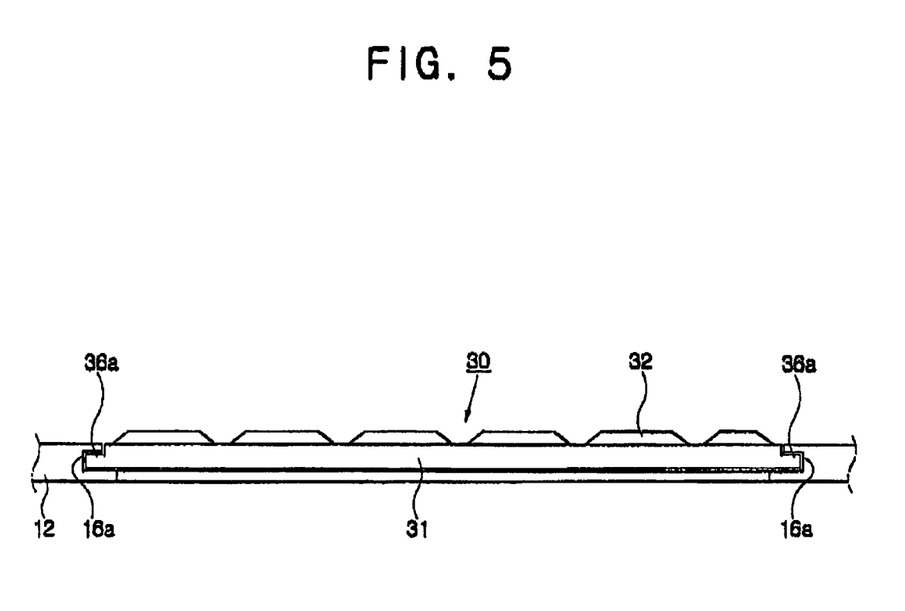
Figure 6:
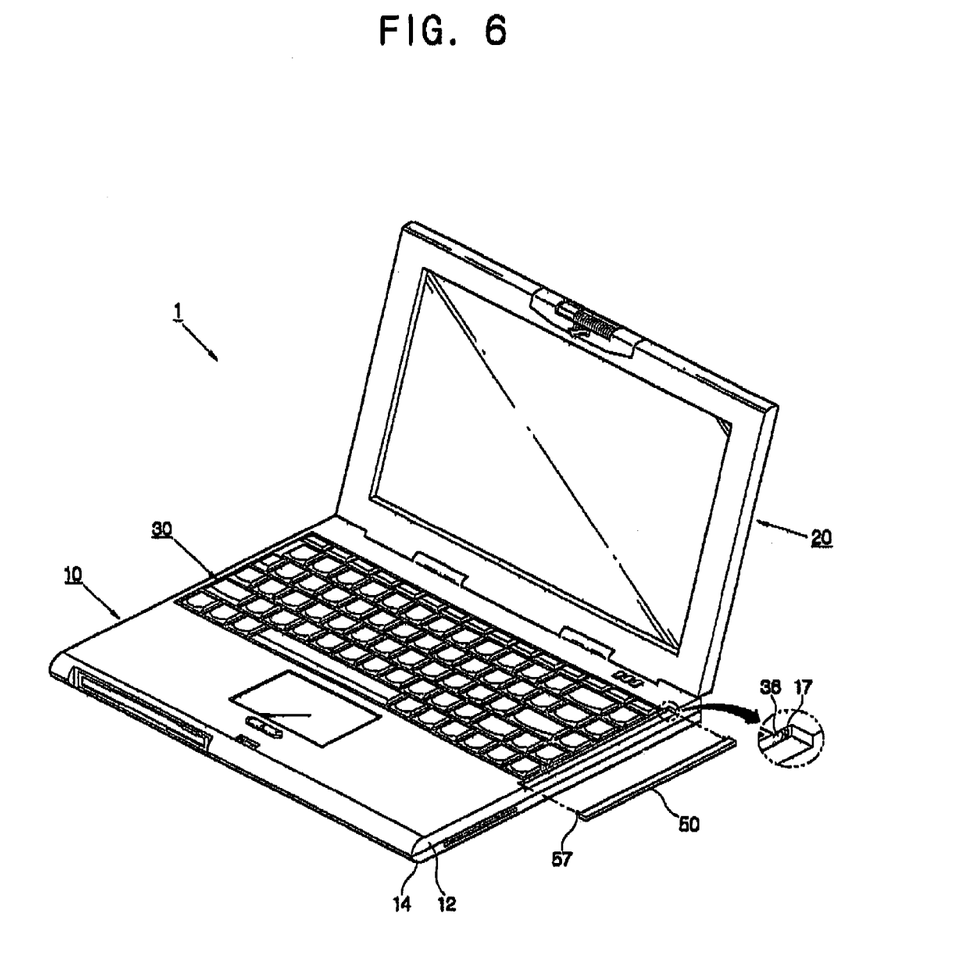
FIG. 6 is a perspective of a portable computer according to another embodiment of the present invention.

FIGS. 4 and 5 are sectional views illustrating different embodiments of the combination between the guiding projections 36, 36a and the guiding grooves 16, 16a. In FIG. 4, the guiding grooves 16 and the guiding projections 36 are semi-circularly shaped and complimentary to each other, wherein the guiding projections 36 are slidingly inserted into the guiding grooves 16. Referring to FIG. 5, in another embodiment of the present invention, the guiding grooves 16a and the guiding projections 36a are rectangular-shaped and complementary to each other, wherein the guiding projections 36a are slidingly inserted into the guiding grooves 16a. Thus, the upper casing 12 and the keyboard assembly 30 are respectively formed with the guiding grooves 16, 16a and the guiding projections 36, 36a, so that the keyboard assembly 30 is not only guided to be slidingly inserted but also firmly combined to the main body 10. Further, the sliding insertion structure between the guiding projections 36, 36a and the guiding grooves 16, 16a causes the contact between the upper casing 12 and the keyboard assembly 30 to be airtight, so that a foreign substance is prevented from being inserted into the main body 10 through a gap between the main body 10 and the keyboard assembly 30.

Figure 2:
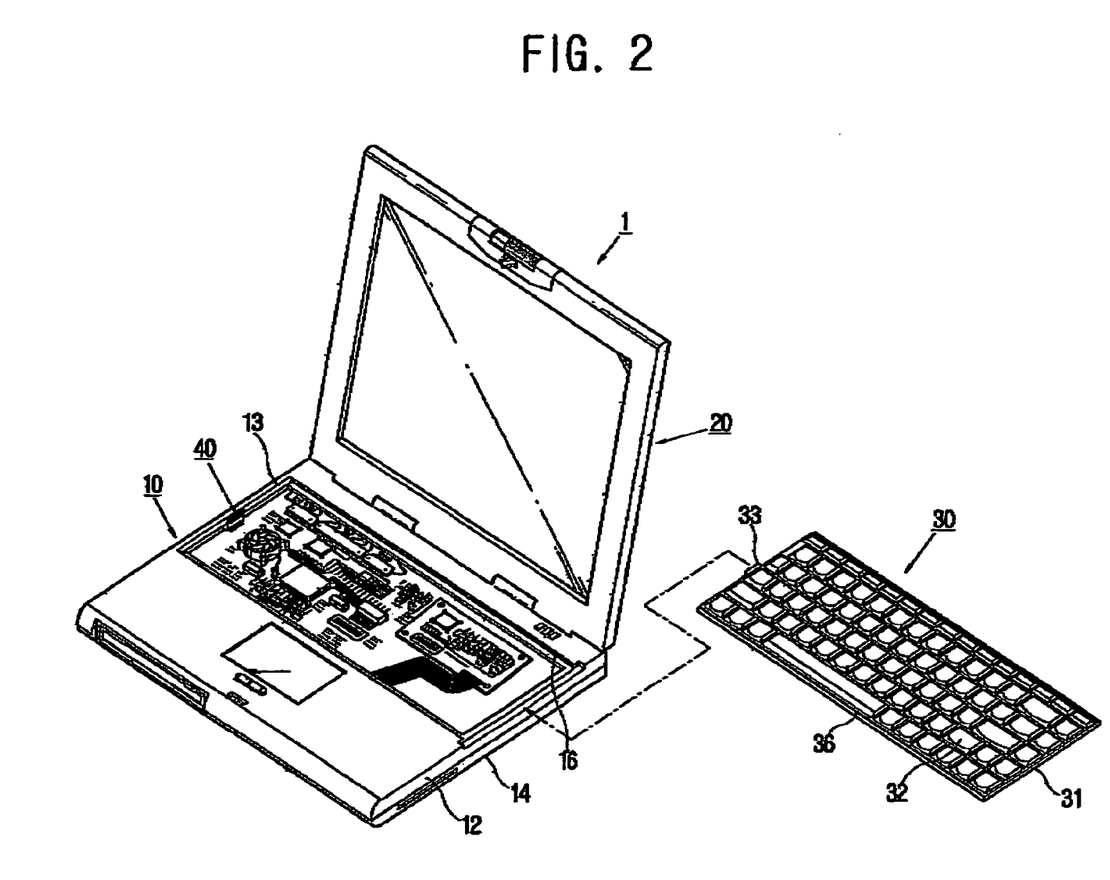
FIG. 2 is an exploded perspective view a portable computer according to an aspect of the present invention.
Figure 3:
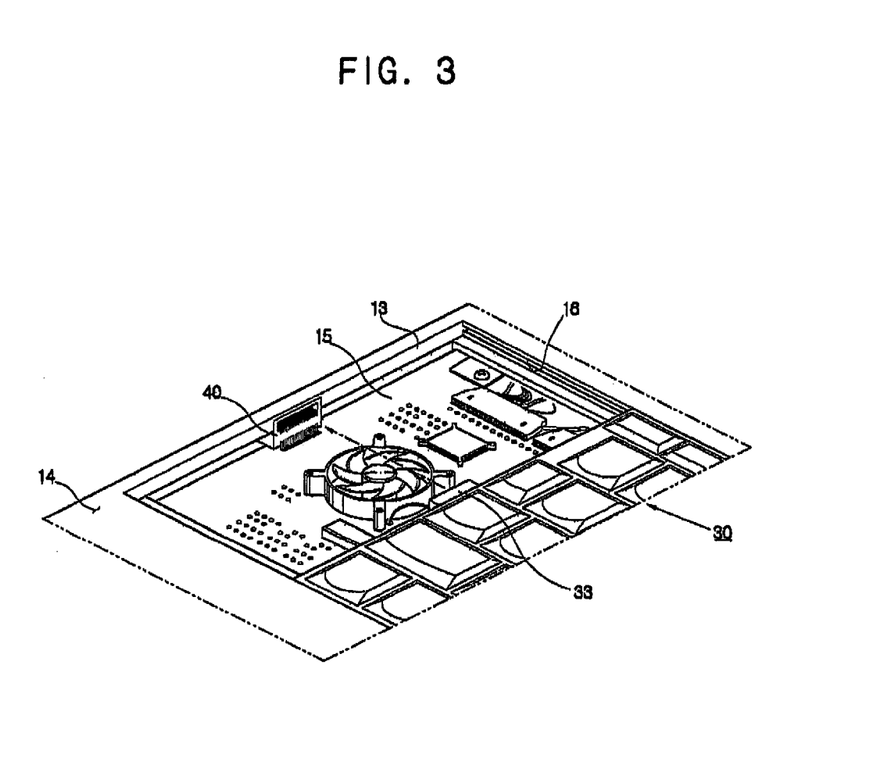
FIG. 3 is a perspective view illustrating a keyboard assembly of FIG. 2 being slidingly inserted in a main body.

The main body 10 further comprises a covering bracket 50 to cover the open side of the keyboard accommodating part 13. The covering bracket 50 is a rectangular-shaped bar to cover the open side of the keyboard accommodating part 13, and comprises protrusions 57 protruding at opposite ends thereof toward the main body 10. The main body 10 comprises protrusion holes 17 into which the protrusions 57 are fitted. Thus, after the keyboard assembly 30 is combined to the main body 10, the open side of the keyboard accommodating part 13 is covered with the covering bracket 50, and the keyboard assembly 30 is prevented from detaching from the main body 10 through the open side of the keyboard accommodating part 13.

Figure 9:
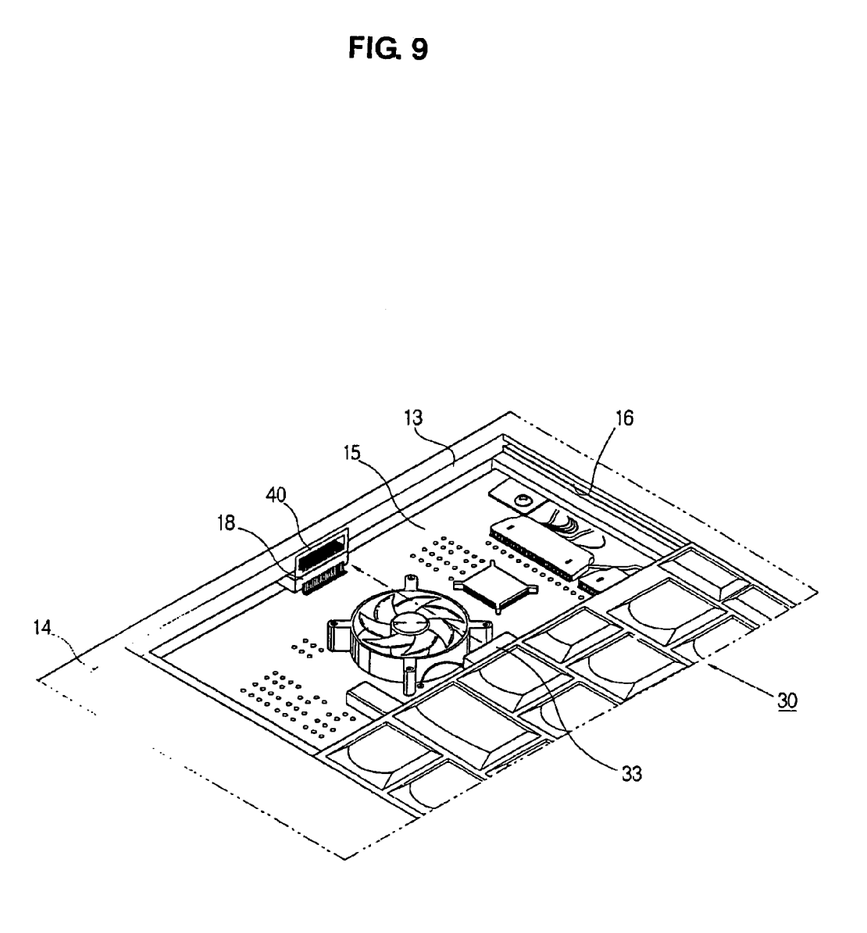
FIG. 9 is a perspective view of a portable computer according to still another embodiment of the present invention.

In the above-embodiment, the main body connector 40 is directly mounted on the main board 15. However, the main body connector may be incorporated with a connecting port 18, being laid on the connecting port 18 such as an earphone jack provided on the main board 15 as shown in FIG. 9, for example.

Figure 7:
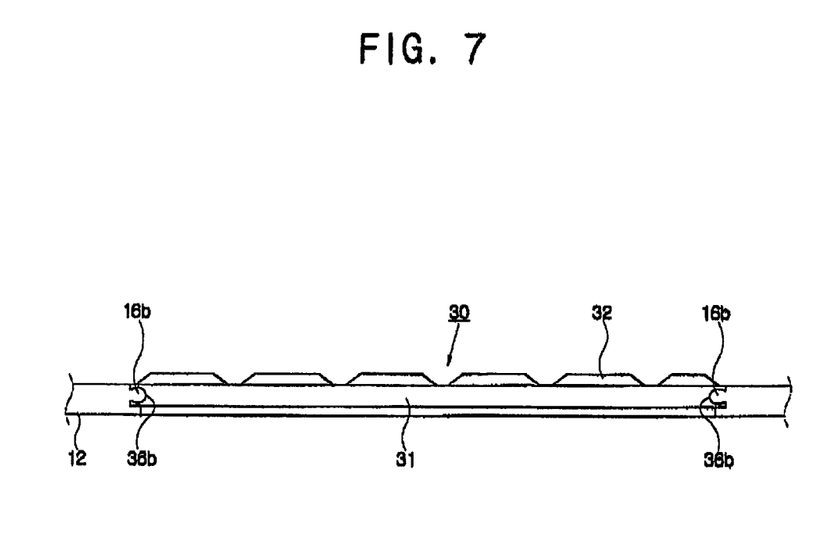
FIG. 7 is a sectional view illustrating a combination between the keyboard assembly and the main body according to still another embodiment of the present invention.

Further, in the above-embodiment, the upper casing 12 is formed with the guiding grooves 16, 16a, and the keyboard assembly 30 is formed with the guiding projections 36, 36a. However, according to another embodiment of the invention, as shown in FIG. 7, the upper casing 12 is formed with guiding projection 16b and the keyboard assembly 30 may be formed with guiding groove 36b. Thus, the cross sections of the guide grooves 16, 16a, 36b and the guide projections 36, 36a, 16b are illustrated by way of example but not limited to, and can be changed without departing from the principles and spirit of the invention.

Figure 8:
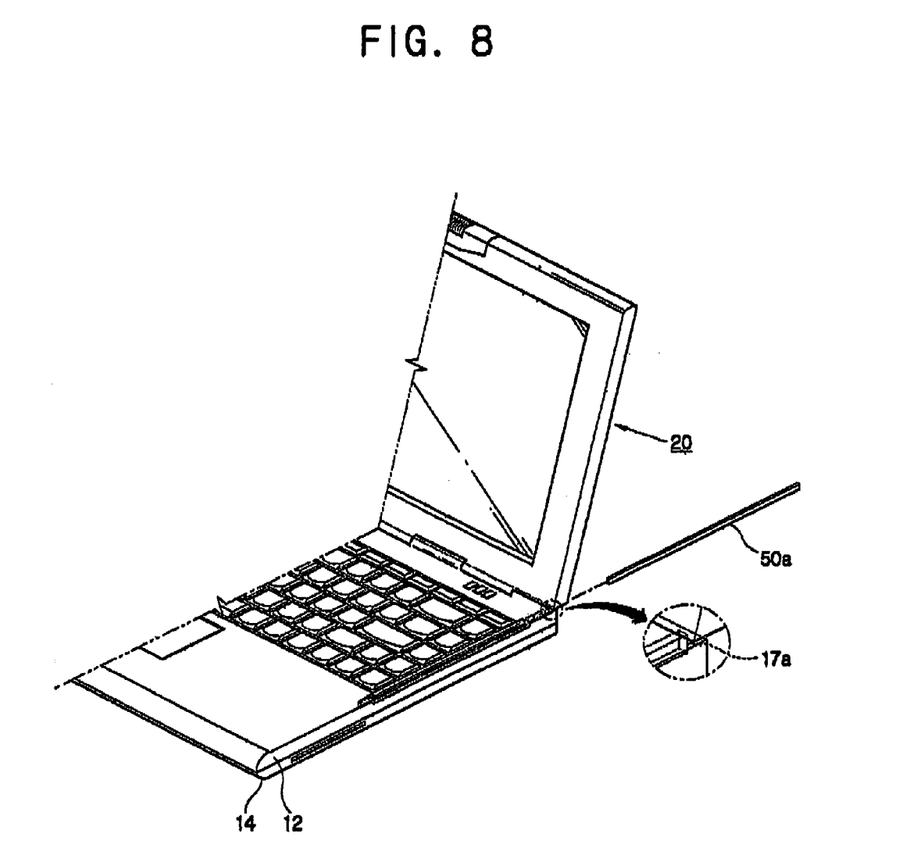
FIG. 8 is a perspective view of a portable computer according to still another embodiment of the present invention.

Further, in the above-embodiment, to combine the covering bracket 50 with the main body 10, there are provided protrusions 57 and protrusion holes 17. However, according to another embodiment of the invention as shown in FIG. 8, the covering bracket 50a may be slidingly inserted through a bracket insertion hole 17a along a lateral surface of the main body 10 to cover the open side of the keyboard accommodating part 13, and may be changed without departing from the principles and spirit of the invention.

As described above, the keyboard assembly 30 is slidingly inserted into the main body 10 from a side of the main body 10 along the surface thereof, with the keyboard connector 33 outwardly protruding in a direction parallel with the surface of the keyboard assembly 30, and the main body connector 40 being connected with the keyboard connector 33 when the keyboard assembly 30 is completely inserted into the main body 10, and transmitting the key signal from the keyboard assembly 30 to the main board 15, so that electrical connection and mechanical connection between the main body 10 and the keyboard assembly 30 are performed simultaneously, thereby simplifying an assembly process and decreasing assembling time.

Further, no additional components are needed such as an FPC to electrically connect the main body 10 with the keyboard assembly 30, and therefore production costs are reduced.

Further, one of the upper casing 12 and the keyboard assembly 30 is formed with the guiding grooves 16, 16a, and the other is formed with the guiding projections 36, 36a, so that the main body 10 and the keyboard assembly 30 are combined firmly and airtight, thereby preventing a foreign substance from being inserted into the main body 10.

As described above, the present invention provides a portable computer in which a structure of a main body and a keyboard assembly enhances an assembly process, reduces production costs, and prevents insertion of a foreign substance into the main body.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A portable computer having a display surface, the portable computer comprising:
   a main body having a main board;
   a keyboard assembly to be slidingly inserted into the main body in a horizontal direction perpendicular to a front end of the main body and relative to the display surface, along a surface of the main body, and comprising a keyboard connector outwardly protruding in a direction parallel to a surface of the keyboard assembly; and
   a main body connector to be connected with the keyboard connector when the keyboard assembly is slidingly inserted into the main body, and transmitting a key signal from the keyboard assembly to the main board, to electrically and mechanically connect the main body and the keyboard assembly simultaneously.

2. The portable computer of claim 1, wherein the main body connector comprises a board-to-board connector protruding upwardly from the main board.

3. The portable computer of claim 1, wherein the main body connector is positioned in an edge of the main body in relation to a sliding insertion.

4. The portable computer of claim 1, wherein the main body comprises at least one connecting port electrically connected to the main board and to which an external device is connected, wherein the main body connector is incorporated with one of the connecting ports and being laid on the connecting port.

5. The portable computer of claim 1, wherein the main body comprises:
   an upper casing comprising a keyboard accommodating part having an open side through which the keyboard assembly is slidingly inserted; and
   a lower casing combined with the upper casing, to form an accommodating space therebetween.

6. The portable computer of claim 5, wherein one of the upper casing and the keyboard assembly comprises guiding grooves along a sliding direction, and
   one of the upper casing and the keyboard assembly comprises guiding projections inserted in the guide grooves and guiding the keyboard assembly to be slidingly inserted, wherein the main body and the keyboard assembly are combined firmly and airtight, to prevent a foreign substance from being inserted into the main body.

7. The portable computer of claim 6, wherein the guiding grooves and the guiding projections are semi-circularly shaped and complementary to each other.

8. The portable computer of claim 6, wherein the guiding grooves and the guiding projections are rectangular-shaped and complementary to each other.

9. The portable computer of claim 5, wherein the main body comprises a covering bracket to cover the open side of the keyboard accommodating after the keyboard assembly has been slidingly inserted into the keyboard accommodating part.

10. The portable computer of claim 9, wherein the covering bracket is a rectangular-shaped bar and comprises protrusions protruding at opposite ends thereof toward the main body of the portable computer.

11. The portable computer of claim 10, wherein the main body further comprises protrusion holes, wherein the protrusions are fitted in the protrusion holes and the open side of the keyboard accommodating part is covered with the covering bracket.

12. The portable computer of claim 9, wherein the covering bracket is slidingly inserted along a lateral surface of the main body, to cover the open side of the keyboard accommodating part.

13. The portable computer of claim 5, wherein the keyboard accommodating part is formed by cutting away a surface of the upper casing to accommodate the keyboard assembly.

14. The portable computer of claim 5, wherein the keyboard accommodating part is a rectangular shape.

15. The portable computer of claim 5, wherein the main body connector does not protrude toward the keyboard assembly beyond the upper casing, to achieve an airtight contact between the upper casing and the keyboard assembly.

16. The portable computer of claim 1, wherein the keyboard connector electrically connects a keyboard circuit board with the main body connector.

17. A method of assembling a portable computer having a display surface, the method comprising:

slidingly inserting a keyboard assembly in into a keyboard accommodating part from a side of a main body of the portable computer in a horizontal direction perpendicular to a front end of the main body and relative to the display surface;

electrically and mechanically connecting the keyboard assembly to the main body of the portable computer simultaneously; and covering an open side of the keyboard accommodating part with a covering bracket after the keyboard assembly has been slidingly inserted into the keyboard accommodating part.

18. A portable computer having a display surface, the portable computer comprising:

a main body having a main body connector; and a keyboard assembly having a keyboard connector, wherein the keyboard assembly is slidingly inserted in a side of the main body in a horizontal direction perpendicular to a front end of the main body and relative to the display surface, to electrically and mechanically connect the main body and the keyboard assembly simultaneously.

* * * * *

UNITED STATES PATENT AND TRADEMARK OFFICE
CERTIFICATE OF CORRECTION

PATENT NO. : 7,265,969 B2 Page 1 of 1
APPLICATION NO. : 10/893897
DATED : September 4, 2007
INVENTOR(S) : Hyuk-soo Jin It is certified that error appears in the above-identified patent and that said Letters Patent is hereby corrected as shown below:

Column 6, Line 35, after "accommodating" insert --part--.

Column 7, Line 1, after "assembly" delete "in".

Signed and Sealed this

Fourth Day of March, 2008

JON W. DUDAS
*Director of the United States Patent and Trademark Office*